May 4, 1937.　　　　G. S. SEWARD　　　　2,079,530
CORN HARVESTER
Filed June 9, 1936　　　　3 Sheets-Sheet 1
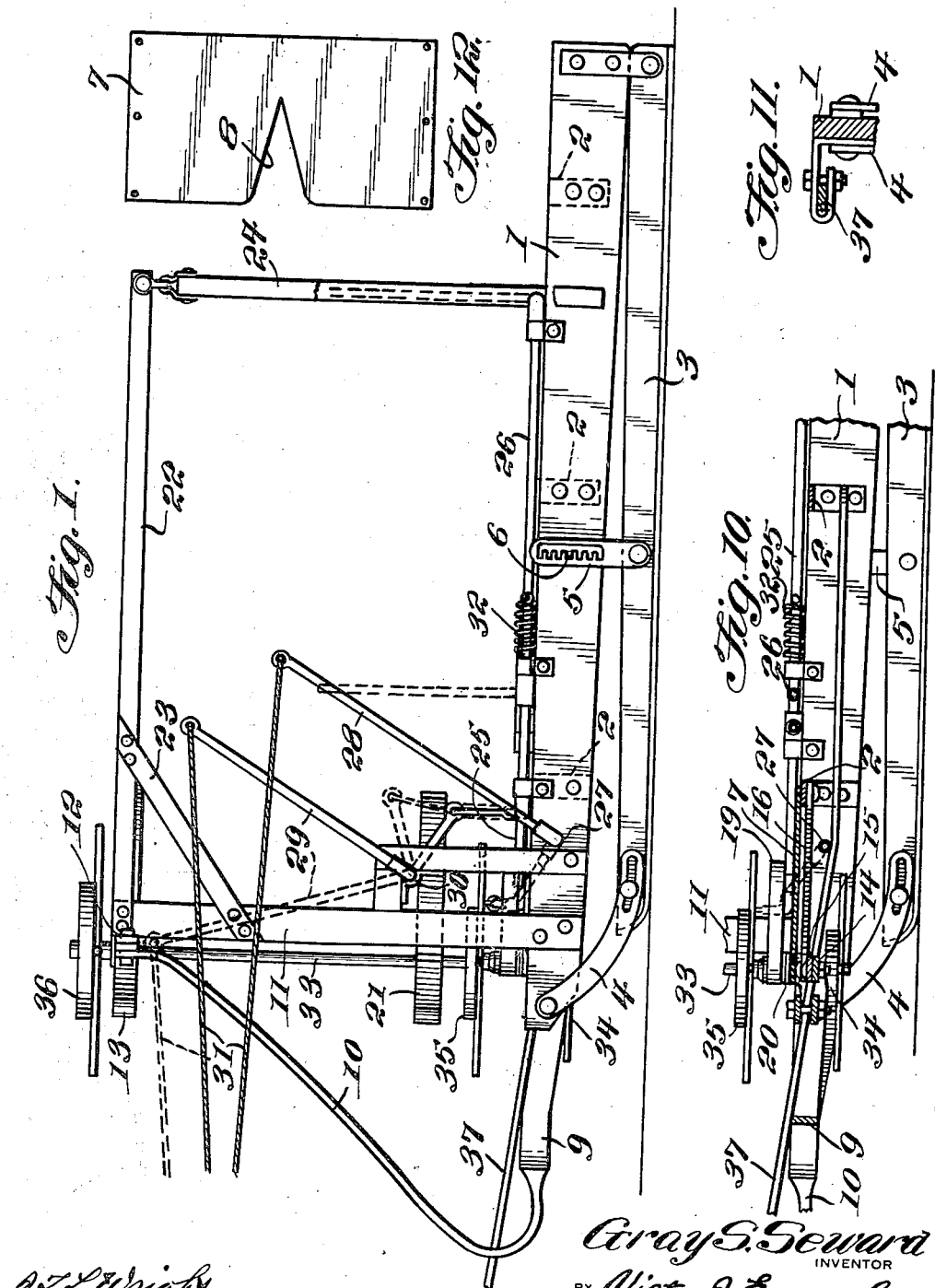
Gray S. Seward
INVENTOR
BY Victor J. Evans & Co.
ATTORNEYS May 4, 1937.  G. S. SEWARD  2,079,530
CORN HARVESTER
Filed June 9, 1936   3 Sheets-Sheet 2
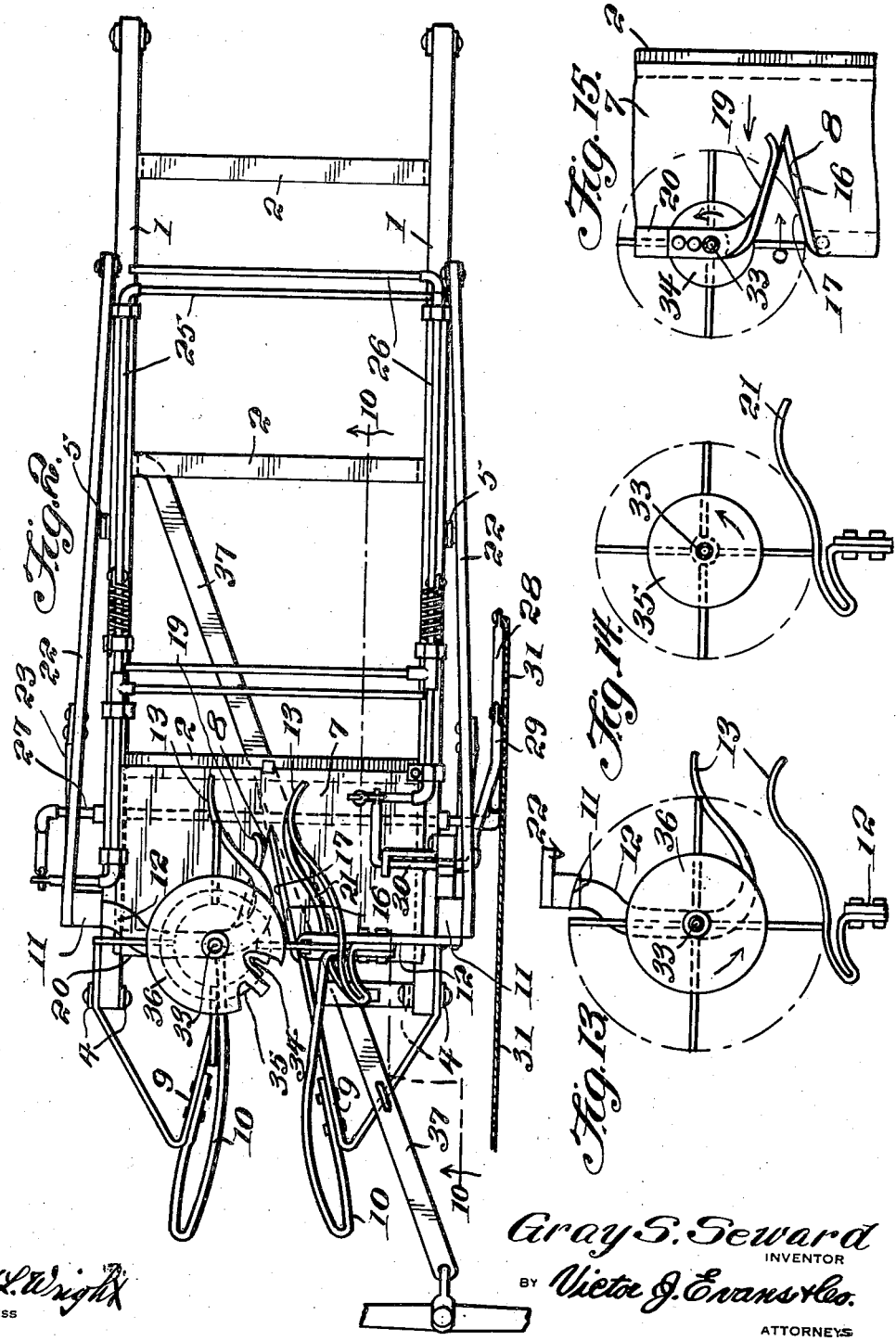

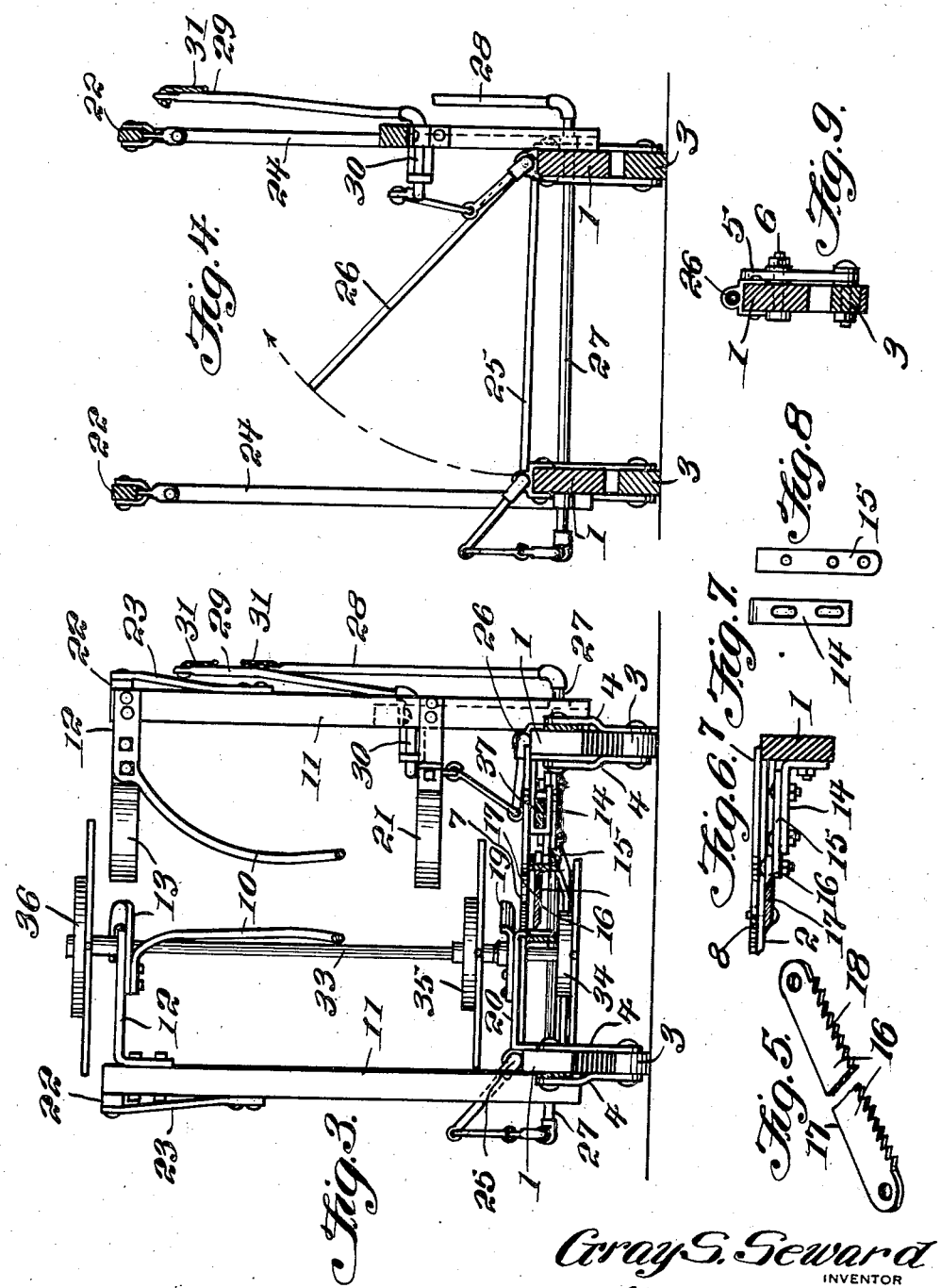

Patented May 4, 1937

2,079,530

UNITED STATES PATENT OFFICE 2,079,530

CORN HARVESTER

Gray S. Seward, High Point, N. C.

Application June 9, 1936, Serial No. 84,346

7 Claims. (Cl. 56—99)

This invention relates to corn harvesters and has for the primary object the provision of a simple and inexpensive device of this character which may be successfully operated by minimum man and animal draft power and which will sever the stalks of corn and collect the latter for dumping in piles at either side of the device so that large acreage of corn may be harvested within a minimum period of time.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a corn harvester constructed in accordance with my invention.

Figure 2 is a top plan view illustrating the device.

Figure 3 is a transverse sectional view illustrating a means of guiding the corn stalks into engagement with the knife and for feeding the stalks rearwardly after being severed.

Figure 4 is a transverse sectional view illustrating the means for dumping the collected corn stalks to either side of the device.

Figure 5 is a perspective view of the knife.

Figure 6 is a detail view showing the means of mounting the knife.

Figure 7 is a plan view showing a bracket for supporting an adjusting plate of the knife.

Figure 8 is a plan view illustrating the adjusting plate for the knife.

Figure 9 is a fragmentary sectional view showing means of adjusting the runners of the device.

Figure 10 is a fragmentary longitudinal sectional view showing the means of mounting the forward ends of the runners to the device.

Figure 11 is a fragmentary sectional view illustrating means of connecting the draft bar to the device.

Figure 12 is a plan view illustrating a supporting plate.

Figure 13 is a fragmentary plan view illustrating one of the end feeding devices.

Figure 14 is a plan view illustrating the intermediate feeding device.

Figure 15 is a fragmentary plan view showing the lower or other end feeding device.

Referring in detail to the drawings, the numeral 1 indicates side members connected by cross bars 2 and pivoted to the rear ends of the side members are runners 3. The runners 3 parallel the side members and the forward ends of said runners are pivotally and slidably connected to connecting members 4. The connecting members 4 are connected to the forward ends of the side members. Pivoted to the runners 3 intermediate the ends thereof are adjusting members 5, the adjusting members having a series of teeth, any of which may engage with pins 6 secured to the side members. By adjusting the pins into engagement with different notches the runners may be adjusted relative to the side members, the purpose of which is to regulate the cutting height of the device. Secured to the side members adjacent their forward end is a bed plate 7 having a V-shaped notch 8 extending inwardly from its forward edge to receive stalks of corn as the device progresses along a row of growing corn.

Horizontal guides 9 are secured to the forward ends of the side members for directing the growing corn towards the notch 8 and secured to the guides 9 are upwardly and rearwardly extending guides 10 also acting to aid in guiding the corn stalks. Vertically arranged posts 11 are secured to the side members adjacent their forward ends and have secured thereto brackets 12 to which are secured upper guides 13 which overlie the bed plate 7 and act to direct the severed corn stalks rearwardly.

A bracket 14 is secured to one of the side members and has adjustably secured thereto a knife attaching plate 15 to which one end of a knife blade 16 is secured, the other end of the knife blade being suitably supported so as to position the knife blade at an angle to the longitudinal axis of the device. The knife blade has a cutting edge 17 and also cutting teeth 18. The blade 16 may be reversed so as to position either the teeth 18 or the cutting edge 17 in operative position for severing the corn stalks.

A guide 19 is secured to a bracket 20 mounted on one of the side members and is disposed opposite the blade 16 for directing the corn stalks into engagement with the blade. A guide 21 is secured to one of the posts 11 and is arranged slightly above the knife and cooperates with the guide 19 in directing the stalks against the blade.

Supporting members 22 are secured to the upper ends of the posts 11 and extend rearwardly therefrom and in parallelism with the side members 1. Braces 23 connect the supporting members 22 to the posts. Pivoted to the supporting members and depending therefrom are restraining bars 24 which act to aid in retaining the severed stalks in pile formation on unloading frames 25 and 26. The unloading frames 25 and 26 normally occupy horizontal positions and are journaled on the side members on which the corn stalks after being severed and moving rearwardly may fall and rest. The unloading members 25 and 26 are of skeleton formation so that either may swing to assume vertical positions for unloading the stacked corn stalks to either side of the device. The unloading device 25 is connected to an operating shaft 27 by linkage and the shaft 27 is journaled to the side members and is connected to an operating lever 28. An operating lever 29 is connected to the unloading member 26 by linkage and a shaft 30 journaled to one of the side members 1. Connected to the levers 28 and 29 are ropes 31 so that the operator from a point remote from the device may effect swinging of the unloading devices into vertical position for unloading the collected corn stalks. The ropes 31 permit the operator to ride upon the draft animal hitched to the device. Springs 32 act to restore the unloading devices in bed forming position.

A shaft 33 is supported for rotation at the forward end of the device or adjacent to the knife blade and has secured thereto feed elements 34, 35 and 36 arranged in superimposed relation. The feed element 34 is arranged slightly below the knife blade and the feed element 35 slightly above the knife blade, while the feed element 36 is arranged above the device in entirety. The feed elements consist of radially extending arms which arms are engaged by the standing stalks of corn during the forward progress of the device so that as the stalks of corn are severed the following standing stalks of corn will cause rotation of the feeding elements and they in turn shove the severed stalks of corn rearwardly to fall upon the unloading devices 25 and 26.

A draft connecting bar 37 is suitably mounted on the device and extends at an angle thereto so that the forward end is positioned laterally or outwardly of one of the side members 1 whereby a draft animal hitched to the forward end of said draft member 37 may draw the device along a row of growing corn. The operator of the device may ride upon the draft animal and actuate the unloading devices 25 and 26 by pulling upon the ropes 31.

Having described the invention, I claim:

1. A corn harvester comprising a frame, runners for said frame, a bed plate secured to said frame, a relatively fixed knife located in advance of said bed plate and carried by the frame for severing corn stalks permitting the severed corn stalks to pass onto the bed plate, means for guiding the corn stalks in engagement with the knife and onto the bed plate and rearwardly of the latter, rotatable feeding elements carried by the frame to be engaged by the corn stalks during the forward movement of the device and acting to move the severed corn stalks rearwardly.

2. A corn harvester comprising a frame, runners for said frame, a bed plate secured to said frame, a knife located in advance of said bed plate and carried by the frame for severing corn stalks permitting the severed corn stalks to pass onto the bed plate, means for guiding the corn stalks in engagement with the knife and onto the bed plate and rearwardly of the latter, rotatable feeding elements carried by the frame to be engaged by the corn stalks during the forward movement of the device and acting to move the severed corn stalks rearwardly, unloading devices journaled to the frame and normally assuming horizontal position to catch the severed corn stalks and accumulate them in a stack.

3. A corn harvester comprising a frame, runners for said frame, a bed plate secured to said frame, a knife located in advance of said bed plate and carried by the frame for severing corn stalks permitting the severed corn stalks to pass onto the bed plate, means for guiding the corn stalks in engagement with the knife and onto the bed plate and rearwardly of the latter, rotatable feeding elements carried by the frame to be engaged by the corn stalks during the forward movement of the device and acting to move the severed corn stalks rearwardly, unloading devices journaled to the frame and normally assuming horizontal position to catch the severed corn stalks and accumulate them in a stack, and means for swinging the unloading devices independently of each other whereby the stacked corn stalks may be unloaded at either side of the frame.

4. A corn harvester comprising a frame, runners for said frame, a bed plate secured to said frame, a knife located in advance of said bed plate and carried by the frame for severing corn stalks permitting the severed corn stalks to pass onto the bed plate, means for guiding the corn stalks in engagement with the knife and onto the bed plate and rearwardly of the latter, rotatable feeding elements carried by the frame to be engaged by the corn stalks during the forward movement of the device and acting to move the severed corn stalks rearwardly, unloading devices journaled to the frame and normally assuming horizontal position to catch the severed corn stalks and accumulate them in a stack, means for swinging the unloading devices independently of each other whereby the stacked corn stalks may be unloaded at either side of the frame, a supporting structure carried by the frame, members pivoted to the supporting structure and depending therefrom for aiding in maintaining the severed corn stalks in stacked formation on the unloading devices.

5. A corn harvester comprising a frame, runners for said frame, a bed plate secured to said frame, a knife located in advance of said bed plate and carried by the frame for severing corn stalks permitting the severed corn stalks to pass onto the bed plate, means for guiding the corn stalks in engagement with the knife and onto the bed plate and rearwardly of the latter, rotatable feeding elements carried by the frame to be engaged by the corn stalks during the forward movement of the device and acting to move the severed corn stalks rearwardly, unloading devices journaled to the frame and normally assuming horizontal position to catch the severed corn stalks and accumulate them in a stack, means for swinging the unloading devices independently of each other whereby the stacked corn stalks may be unloaded at either side of the frame, a supporting structure carried by the frame, members pivoted to the supporting structure and depending therefrom for aiding in maintaining the severed corn stalks in stacked formation on the unloading devices, guides carried by the frame and extending forwardly thereof to direct growing corn stalks in engagement with the knife.

6. A corn harvester comprising a main frame, runners adjustably secured to the main frame, a bed plate secured to the main frame and having a V-shaped notch extending inwardly from the forward edge thereof to receive growing corn stalks, guides for directing the corn stalks into the notch, a knife for severing the corn stalks and extending angularly over the bed plate, guides for directing the severed corn stalks rearwardly of the main frame, feeders carried by the main frame and operated by contact with the growing corn stalks to feed the corn stalks rearwardly after being severed, unloading devices journaled to the main frame rearwardly of the bed plate on which the severed stalks may accumulate, and means whereby either of said unloading devices may be actuated.

7. A corn harvester comprising a main frame, runners adjustably secured to the main frame, a bed plate secured to the main frame and having a V-shaped notch extending inwardly from the forward edge thereof to receive growing corn stalks, guides for directing the corn stalks into the notch, a knife for severing the corn stalks and extending angularly over the bed plate, guides for directing the severed corn stalks rearwardly of the main frame, feeders carried by the main frame and operated by contact with the growing corn stalks to feed the corn stalks rearwardly after being severed, unloading devices journaled to the main frame rearwardly of the bed plate on which the severed stalks may accumulate, means whereby either of said unloading devices may be actuated, and a draft bar connected to the main frame and extending angularly with respect thereto and terminating at its forward end at one side of said main frame to which a draft animal may be hitched.

GRAY S. SEWARD.